United States Patent [19]

Hara et al.

[11] 4,411,964
[45] Oct. 25, 1983

[54] COMPOSITE COATING STEEL SHEETS HAVING GOOD CORROSION RESISTANCE PAINTABILITY AND CORROSION RESISTANCE AFTER PAINT COATING

[75] Inventors: Tomihiro Hara; Masahiro Ogawa; Masakazu Tsukada; Masaaki Yamashita, all of Yokohama, Japan

[73] Assignee: Nippon Kokan Kabushiki Kaisha, Tokyo, Japan

[21] Appl. No.: 331,663

[22] Filed: Dec. 17, 1981

[30] Foreign Application Priority Data

Dec. 24, 1980 [JP]  Japan .................................. 55-182112

[51] Int. Cl.³ ........................ C25D 3/04; C25D 11/38
[52] U.S. Cl. .................................. 428/626; 428/629; 428/632; 428/666; 428/928; 428/623; 204/28
[58] Field of Search ............... 428/623, 629, 632, 666, 428/928, 626; 204/28

[56] References Cited

U.S. PATENT DOCUMENTS

| | | | |
|---|---|---|---|
| 3,558,442 | 1/1971 | Roehl et al. | 204/28 |
| 3,671,205 | 6/1972 | Uchida et al. | 428/623 |
| 3,743,551 | 7/1973 | Sanderson | 428/623 |
| 3,799,814 | 3/1974 | Yamagishi et al. | 428/623 |
| 3,827,866 | 8/1974 | Uchida et al. | 428/623 |
| 3,860,398 | 1/1975 | Tsurumaru et al. | 428/623 |
| 4,069,360 | 1/1978 | Yanagisawa et al. | 428/928 |
| 4,152,487 | 5/1979 | Yanagisawa | 428/928 |
| 4,162,350 | 7/1979 | Yanagisawa et al. | 428/928 |
| 4,249,999 | 2/1981 | Tsuda et al. | 204/28 |
| 4,298,661 | 11/1981 | Ikeuo et al. | 428/632 |
| 4,307,156 | 12/1981 | Yanagisawa | 428/632 |
| 4,313,996 | 2/1982 | Newman et al. | 428/623 |

*Primary Examiner*—Veronica O'Keefe
*Attorney, Agent, or Firm*—Frishauf, Holtz, Goodman & Woodward

[57] ABSTRACT

A composite coating steel sheet is disclosed which has good corrosion resistance, paintability and corrosion resistance after paint coating. The steel sheet comprises a plated base steel sheet, such as a galvanized, zinc alloy plated or aluminum plated steel sheet, and a chromate film formed on the plated base steel sheet. A composite silicate resin film is formed on the chromate film. The composite silicate film is composed of a reaction product of a colloidal silica, an organic resin and a silane compound.

25 Claims, 2 Drawing Figures

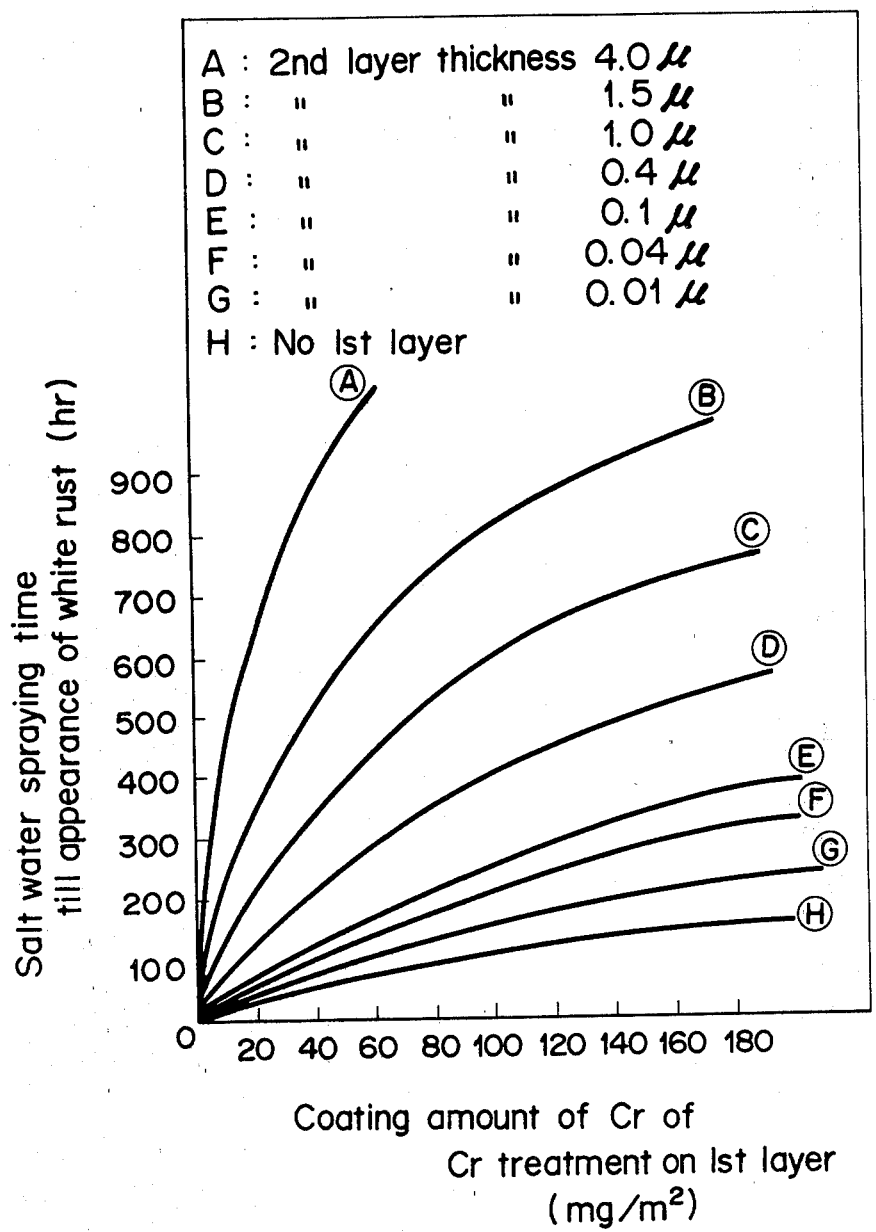
FIG_1

FIG_2
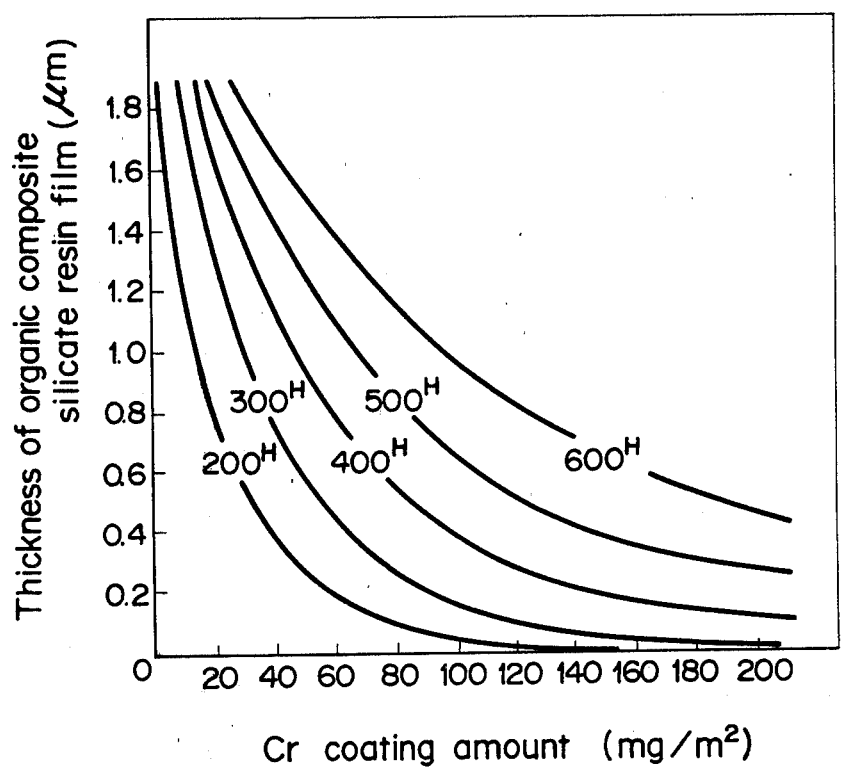

4,411,964

COMPOSITE COATING STEEL SHEETS HAVING GOOD CORROSION RESISTANCE PAINTABILITY AND CORROSION RESISTANCE AFTER PAINT COATING

BACKGROUND OF THE INVENTION

1. Field of the Invention

This invention relates to a composite coating steel sheet and particularly to a plated base steel sheet provided thereon with multiple coatings to improve corrosion resistance, paintability and corrosion resistance after paint coating.

2. Description of the Prior Art

Chromate treatment has been commonly employed as rust preventive treatment of galvanized steel sheets, zinc alloy plated steel sheets and aluminum plated steel sheets. In most cases, such treatment is intended merely for a temporary rust preventive measure and the corrosion reistance thereby obtained is at a low level such that white rust appears in 24 to 48 hours when the treated steel sheets are subjected to a salt spray test. Accordingly, in a case where the products are intended for use under a severe corrosive environment for a long period of time, there has been no practical way other than applying a thick paint coating at a level of more than $10\mu$ to prevent corrosion. However, in recent years the costs of paints have been rapidly raised reflecting the increase in price of petroleum products, and it is strongly desired to develop steel sheet products having good corrosion resistance, which can be produced simply by surface treatments without using paints.

Under the circumstances, there has been a certain development in the art of chromate treatment. A typical one is a coating type chromate treatment in which various binders are added to the chromate treatment solution, whereby products having improved corrosion resistance are actually produced. Even in this case, however, the corrosion resistance thereby obtainable is at best at a level of 200 hours against formation of white rust when subjected to a salt spray test.

Even when paint coating is required to provide an aesthetic outer appearance, it is usual to attempt to cut down the costs for the paint by choosing a low grade paint or by minimizing the thickness of the paint coating. In such a case, the steel sheets are required to have not only high corrosion resistance but also good paintability and corrosion resistance after paint coating. It is necessary that these properties are well balanced.

However, there has been no chromate treated products which fully satisfy these requirements. Some products which satisfy the requirement for high corrosion resistance, tend to fail in providing adequate paintability or corrosion resistance after paint coating. Whereas those having good paintability tend to fail in the requirement for high corrosion resistance.

For example, so-called unichrome treatment is known whereby it is intended to provide high corrosion resistance without paint coating by means of a reactive chromate. According to this method, a plated steel sheet is dipped in a treatment solution composed of chromic acid and a mineral acid for a long period of time to form a chromate film coating having a thickness of from about 500 to about 700 mg/m$^2$ as calculated as the amount of metal chromium. However, such a treatment has drawbacks that the dipping process requires a long period of time and the degradation or ageing of the treatment solution is rapid, and it is totally unsatisfactory as a strip coating technique. Further, as the chromate film is rather thick, it is susceptible to cracking and its paintability is not good. If the thickness of the chromate film is decreased to a level of 100 mg/m$^2$, the film cracking may be avoided, but the corrosion resistance is reduced to a level of 100 hours, thus loosing the high corrosion resistant characteristics.

On the other hand, in coating type chromate treatment, a binder is used to fix or trap a substantial amount of chromium therein and to prevent the film cracking by the binder. However, it has a drawback that the treatment solution is susceptible to gelation, and even when it is not susceptible to gelation, it tends to form a thick film which requires a special treatment for drying.

In recent years, it has been proposed, for the purpose of avoiding the above mentioned difficulties, to form a double layer coating by duplex plating treatment. Namely, a thin chromate film is formed as the first layer in a short period of time, and then an inorganic or organic substance is coated thereon to form a film as the second layer which protects the first layer of the chromate film. Use of inorganic materials is disclosed in Japanese Laid-Open Patent Application No. 9545/75 and Japanese Patent Publication No. 19981/78 in which a chromate film is electrolytically formed as the first layer and a treatment solution comprising a chromic acid and silica sol is applied and then dried to form a film as the second layer. High corrosion resistance is obtainable by forming the second layer sufficiently thick. However, the film thereby obtained is apt to be peeled off because of the thick silica layer and thus lacks in durability after processing. Further, as the silica sol has poor affinity to a paint, the treated surface is not satisfactory as a substrate for paint coating.

A typical example in which an organic material is used for the second layer, is Japanese Patent Publication No. 35620/77, in which a chromimum hydrated oxide layer is formed as the first layer and then a water soluble organic resin layer is formed as the second layer. However, adequate effectiveness cannot be expected from the organic resin layer disclosed therein, since the functional groups present in the organic resin of the second layer tend to attract water and therefore it is impossible to obtain a high level of corrosion resistance. Even if the thickness of the second layer is increased as much as $1\mu$, a high level of corrosion resistance will not be obtainable, and in such a case, it will be difficult to completely dry the film by hot air only and a special apparatus for drying will be required.

Further, in Japanese Patent Publications No. 36100/74, No. 18445/75, No. 4611/74 and No. 1986/74, it is proposed to form a chromate film as the first layer and an organic film as the second layer. However, in each of these cases, the functional groups in the organic resins in the second layer tend to attract water and it is impossible to obtain a high level of corrosion resistance. These products are presumably effective rather as a substrate for paint coating taking the advantage of the functional groups.

As mentioned above, the products having a second layer formed with an inorganic or organic material are effective either for the corrosion resistance without paint coating or for the paintability, but they can not satisfy both of the required properties at the same time. It is conceivable to form the second layer with use of a mixture of an organic material and an inorganic material. However, a mere mixture does not provide better results, and to the contrary, it is likely in many cases that desirable properties of the individual components are imparied.

Thus, it has been difficult to produce a chromate treated steel sheets which are substrates for paint coating and which at the same time have superior corrosion resistance.

SUMMARY OF THE INVENTION

Accordingly, it is an object of the present invention to overcome the above mentioned difficulties in the conventional surface treated steel sheets, and to provide steel sheets having good corrosion resistance, paintability and corrosion resistance after paint coating.

It has now been found that superior corrosion resistance, paintability and corrosion resistance after paint coating are obtainable by forming, on a plated base steel sheet such as a galvanized steel sheet, a zinc alloy plated steel sheet or an aluminum steel sheet, a first layer of a chromate film by chromate treatment of either reaction type or coating type and then forming, on such a first layer, a second layer of a composite silicate resin film composed of silica sol and an organic resin. If either one of the first and second layers is omitted, the desired level and balance of the properties are not obtainable.

Thus, the present invention provides a composite coating steel sheet which comprises a plated base steel sheet, a chromate film formed on the surface of the plated steel sheet and a composite silicate resin film formed on the chromate film and comprising a colloidal silica, an organic resin and a silane compound.

BRIEF DESCRIPTION OF THE DRAWINGS

FIGS. 1 and 2 show graphs illustrating a relationship between the coating amount of chromium and the thickness of the composite silicate resin film, and the corrosion resistance thereby obtained.

DETAILED DESCRIPTION OF THE INVENTION

Plated Base Steel Sheet

As the plated base steel sheet there may be used a galvanized steel sheet, a zinc-iron alloy plated steel sheet, a zinc-nickel alloy plated steel sheet, a zinc-manganese alloy plated steel sheet, or an aluminum plated steel sheet. It may further be a multi-layer plated steel sheet which has become popular in recent years, and which has two or more such plated layers. In the case of the zinc-iron alloy plated steel sheet, the iron content in the plated layer is from 5 to 50% by weight, preferably from 10 to 30% by weight. If the iron content is outside this range, the corrosion resistance and paintability become poor. In the case where the zinc-nickel plated steel sheet is employed, the nickel content in the plated layer is from 5 to 20% by weight, preferably from 12 to 13% by weight. If the nickel content is less than 5%, the corrosion resistance becomes poor. On the other hand, if the nickel content is more than 20%, it simply adds to the cost and such is not economically practical.

Chromate Film

A chromate film is formed on the above mentioned plated base steel sheet as the first layer.

The chromate treatment to form this first layer of the chromate film may be conducted in accordance with chromate treatment known per se in the art. The amount of chromium deposited on the base steel sheet must be from 10 to 150 mg/m$^2$, preferably from 40 to 100 mg/m$^2$. If the amount is less than 10 mg/m$^2$, the film tends to be uneven. On the other hand, an excessive amount over 150 mg/m$^2$ is not desirable as it facilitates degradation of the treatment solution and adds to the costs. As a typical example, a reaction type chromate treatment solution comprises from 1 to 100 g/l, as calculated as metal chromium, of a water soluble chromium compound, and from 0.2 to 20 g/l of sulfuric acid, as major component, in which the trivalent chromium content in the total chromium is not more than 50% by weight, preferably from 20 to 35% by weight. Proper amounts of heavy metal ions such as $Zn^{2+}$, $Co^{2+}$, or $Fe^{3+}$, or other mineral acids such as phosphoric acid or hydrofluoric acid, may further be added.

With respect to the chromium compound among the major components, if the amount, as calculated as metal chromium, is less than 1 g/l, it is difficult to obtain the desired chromate film in a short period of time. On the other hand, if the amount exceeds 100 g/l, the stability of the treatment bath will be impaired to a considerable extent.

With respect to sulfuric acid, if the amount is less than 0.2 g/l the desired chromate film cannot easily be obtained in a short period of time, and uniformity in treatment becomes poor. On the other hand, if the amount exceeds 20 g/l, the etching rate of zinc tends to be too fast to be desirable.

If the proportion of $Cr^{3+}$ in the total chromium exceeds 50%, the stability of the bath will be disturbed, whereupon the bath tends to undergo gelation, and the corrosion resistance of the steel sheet before paint coating will be poor so that even when the coating amount of the chromate film is at the predetermined level, the desired high level of corrosion resistance is not obtainable.

The function of the addition of heavy metal ions such as $Zn^{2+}$ besides the above mentioned major components, is to improve the treating efficiency of the treatment solution, and their amounts may suitably be determined depending upon the proportions of the major components.

As a typical example of a coating type chromate treatment solution, there may be mentioned a treatment solution prepared by adding to the above mentioned reaction type chromate treatment solution, an organic polymer resin containing in its molecule a substantial number of carboxyl groups and which is water soluble and compatible with the above mentioned reaction-type chromate treatment solution and adjusting the pH to from 2.0 to 3.5. As the organic polymer, it should preferably have an average molecular weight of from 1,000 to 500,000. The amount of the organic polymer is selected within a range of from 0.02 to 30 g/l as calculated at the resin. If the amount is less than 0.02 g/l, it is not possible to completely trap chromium in the film when the film is formed. On the other hand, if the amount exceeds 30 g/l, the stability of the bath tends to be poor. If the pH is less than 2.0, the bath tends to have characteristics similar to the reaction-type chromate treatment solution, and if the pH exceeds 3.5, the stability of the bath tends to be impairred.

In any case, the chromium amount in the first layer of the chromate film should be within a range of from 10 to 150 mg/m$^2$. It is important that when the treatment solution for the second layer is applied, there should not be elution of chromium from the first layer. If an eluted component from the first layer enters the composite silicate resin treatment solution during the treatment of the second layer, the balance of the resin treatment solution will be disturbed, and in an extreme case, gelation of the treatment solution will occur. Accordingly, it is necessary to conduct forcible drying and washing with water after the treatment of the first layer so as to prevent elution of the components from the first layer.

Composite Silicate Resin Film

The composite silicate resin film is formed on the above mentioned first layer of the chromate film.

The composite silicate resin is composed of a resin or a mixture of resins, which are prepared by reacting a water dispersible silica with a water soluble or water dispersible organic polymer resin having in its molecule a hydroxyl group (such as polyvinyl alcohol, hydroxyethyl cellulose, starch, polyester, alkyd, epoxy ester or acrylic copolymer) in the presence of a silane compound. As the silica, so-called colloidal silica having a particle size of 7 to 100$\mu$, preferably from 10 to 50$\mu$, is used. As the resin to be used may be any resin so long as it can react and bond with the silica. Further, ultraviolet or electon beam curing type functional groups may be introduced to the structure of the resin.

The role of the silane compound is to act as a catalyst during the composite forming reaction of the silica with the organic resin and to perform an important function as a cross linking agent for the reactants and as a cross linking agent to establish a firm bond between the second layer and the first layer. As such a silane compound, a commercially available product may be used.

The ratio of the water dispersible silica to the water soluble or water dispersible organic resin in the composite silicate resin composition, must be from 5:95 to 95:5, based on the weight ratio of the solid content. If the ratio is less than the lower limit, a high level of corrosion resistance is not obtainable even when applied to the first layer of the chromate film. On the other hand, if the ratio exceeds the upper limit, good paintability is not obtainable. The amount of the silane compound is from 0.5 to 15% by weight, preferably from 1 to 10% by weight, based on the weight of the total solid content of the silica and organic resin. If the amount is less than 0.5% by weight, adequate cross linking with the chromate film cannot be expected. On the other hand, if the amount exceeds 15% by weight, no further improvement of the effectiveness is observed.

Further, by an addition of an alkoxide chelate compound to the above mentioned composite silicate resin treatment solution, the corrosion resistance can be improved. The alkoxide chelate compound has a structure of $R_2MR_2'$, $RM_3'$, $MR_4'$ or $R_3MR'$, where R is an allyl group or an aryl group, which may have an amino group or a mercapto group on its side chain, M is titanium, zirconium or aluminum, and R' is a radical composed of an alkoxy group having from 1 to 8 carbon atoms or an alkoxyalkoxy group having from 2 to 10 carbon atoms, which is condensed with a dicarboxylic acid, a hydroxycarboxylic acid, a diketone, an ester or an alkanolamine, as the ligand.

The alkoxide chelate compound is added to the composite silicate resin in a solid content weight ratio of the resin: the alkoxide chelate compound being from 97:3 to 80:20. If the amount of the alkoxide chelate compound is less than the lower limit, free hydroxyl groups left in the cured film become substantial and it is impossible to improve the corrosion resistance or water repelling property to an adequate degree. On the other hand, if the amount is in excess of the upper limit, the condensation of the alkoxide chelate compound itself occurs preferentially, and it becomes difficult to form a uniform film. Further, the alkoxide chelate compound tends to undergo self-polymerization and become viscous at time passes thus leading to thickening of of the composite silicate resin treatment solution whereby the treatment solution becomes hardly applicable after several days from its preparation. In order to avoid, such a difficulty, at least one of the additives selected from the group consisting of oxy acids of molybdenum, tungsten, vanadium, tin, boron, and silicon and salts of such oxy acids may be added to the composite silicate resin treatment solution in place of the alkoxide chelate compound.

The amount of such additives should be not more than 10% by weight, preferably from 0.3 to 5% by weight, based on the solid content weight of the composite silicate resin treatment solution. If the amount exceeds 10% by weight, there is an undesirable possibility of deterioration of the stability of the treatment solution.

Further, one or more such additives may be added together with the above mentioned alkoxide chelate compound. In such a case, the total amount of such additives and the alkoxide chelate compound should be not more than 10% by weight, preferably from 0.3 to 5% by weight, based on the solid content weight of the composite silicate resin, and the ratio of the alkoxide chelate compound: such additives should be from 95:5 to 5:95, preferably from 80:20 to 20:80. Effectiveness is obtainable within the above ranges, and if the total amount of addition exceeds the upper limit, there is a possibility that the stability of the treatment solution is disturbed.

In the case where the composite silicate resin is composed of a reaction product of polyvinyl alcohol and the silica sol, it is possible to improve the drying characteristic of the film by incorporating, together with the alkoxide chelate compound, one or more additives selected from the group consisting of water soluble salts of copper, zinc, aluminum, zirconium, chromium, cobalt, and nickel (for instance, zinc chloride), and coodination compounds of such elements (for instance, ethylenediamine tetraacetic acid zinc complex salt). The amount of such additives is preferably from 0.3 to 5% by weight, based on the solid content weight of the composite silicate resin. If the amount exceeds this upper limit, there is a possibility that the stability of the composition is disturbed. Further, the ratio of the composite silicate resin plus such additives to the alkoxide chelate compound is from 97:3 to 80:20, based on the solid content weight.

Further, in the case where an ultraviolet or electron beam curing type resin is employed, it is possible to facilitate the curing of the composite silicate resin film by incorporating a photosensitizer such as zinc oxide, titanium oxide (anatase type) or titanic acid, and an oxy acid of molybdenum, tungsten or vanadium (for instance, vanadium trioxide) or its salt (for instance, lithium orthovanadate). This is attributable to the fact that an oxidation reduction reaction occurs among the three components, whereby the functional groups in the resin and a cation compound formed by the reaction form a salt bond or a coordination bond. The amount of the oxy acid or its salt is from 0.1 to 6% by weight, based on the solid content weight of the composite silicate resin, and the amount of the photosensitizer is from 30 to 200% by weight, based on the amount of the oxy acid or its salt.

Relation Between the Thickness of the Chromate Film and the Thickness of the Composite Silicate Resin Film Now, the relation between the first layer of the chromate film and the second layer of the composite silicate resin film will be described. An interrelation exists, as shown in FIG. 1, between the coating amount of chrominum for the first layer and the film thickness of the second layer. For the coating amount of chromium for the first layer being from 10 to 150 mg/m$^2$, the film thickness of the second layer must be from 0.01 to $\mu$4. Therefore, in order to obtain a predetermined level of corrosion resistance, it is necessary to select the coating amount of chromium for the first layer and the film thickness of the second layer based on this relationship. For instance, in order to obtain corrosion resistance of 500 hours, if the coating amount of chromium in the first layer is 40 mg/m$^2$, the film thickness of the second layer must be at least 1.5$\mu$, and if the coating amount of chromium is 150 mg/m$^2$, the film thickness of the second layer must be at least 0.4$\mu$.

Generally, for the purpose of practical application, it is desirable that for the coating amount of chromium being from 10 to 150 mg/m$^2$, the fiom thickness of the second layer is set to be from 0.4 to 4$\mu$. The above ranges are desirable from the standpoint of the manufacture of the products, and as is apparent from the graph of FIG. 1, if the film thickness of the second layer is set to be less than 0.4$\mu$, it is necessary to increase the coating amount of chromium, which tends to lead to degradation of the chromate treatment solution. On the other hand, if the film thickness of the second layer is set to be greater than 4$\mu$, the costs will increase to an uneconomical level and the products become hardly weldable under commonly employed welding conditions, although the degradation of the chromate treatment solution will be reduced.

However, in a case where such a high level of corrosion resistance is not required, the film thickness of the second layer may be less than 0.4$\mu$ and at least 0.01$\mu$ for the coating amount of chromium in the first layer being from 10 to 150 mg/m$^2$. In this case, the conditions for both layers to provide the desired corrosin resistnace may be presented in a more obvious manner by modifying the graph as shown in FIG. 2, in which the vertical axis is for the film thickness of the second layer and the horizontal axis is for the coating amount of chromium of the first layer, and the corrosion resistance represented by the spraying time of a salt spray test is presented as a parameter. From FIG. 2, it will be understood that in order to obtain corrosion resistance of 200 hours, for instance, the film thickness of the second layer may be set to be 0.1$\mu$ when the coating amount of chromium of the first layer is 80 mg/m$^2$, and 0.02$\mu$ when the coating amount of chromium is 120 mg/m$^2$.

Having thus described the relationship between the coating amount of the first layer and the film thickness of the second layer, it should be added that it is essential to provide a double layer structure composed of the chromate film and the composite silicate resin film. Without this double layer structure, a high level of corrosion resistance is not obtainable.

Now, the invention will be described with reference to the Examples.

EXAMPLES

Tests for white rust formation, paintability and corrosion resistance after paint coating were conducted with respect to the steel sheets No. 1 to No. 37 of the present invention which had various coating amounts of chromium in the respective first layers and various film thicknesses of the respective second layers, as indicated in the Table below. The results thereby obtained are shown in comparison with comparative steel sheets No. 38 to No. 53. As the chromate treatment solution for the first layer, the following three compositions were used as representatives:

A: $(CrO_3, H_2SO_4, H_3PO_4) = (10$ g/l, 2 g/l, 2 g/l$)$

B: $(CrO_3, H_2SO_4, Cr^{3+}, Zn^{2+}) = (10$ g/l, 2 g/l, 2 g/l, 3 g/l$)$

C: To the composition B, 2 g/l of a polyacrylic acid having a molecular weight of about 100,000 was added, and then the pH was adjusted to 3 with aqueous ammonia.

Further, as the composite silicate resin treatment solution, the following three compositions were used as representatives:

(a): As the organic resin, an acrylic copolymer and an epoxy resin were mixed in a solid content ratio of 70:30, and the mixture was reacted and bonded with silica sol in a solid content ratio of 60:40.

(b): To the treatment solution (a), trifunctional dibutyl titanate prepared by reacting butyl titanate with triethanol amine was added as the alkoxide chelate compound in a solid content weight ratio of 90:10.

(c): To the treatment solution (a), ammonium metavanadate was added in a solid content weight ratio of 100:1.

However, it should be understood that the treatment solutions are not limited to those mentioned above.

As the plated base steel sheets, there were used, an electro-galvanized steel sheet, an zinc-nickel alloy plated steel sheet, and an electrolytically formed zinc-iron alloy plated steel sheet. As the plated base sheet, other zinc alloy plated steel sheets or aluminum plated steel sheets may also be used.

The steps of the treatments were as follows:

Weak alkaline degreasing→washing with water→drawing→reaction type chromate treatment (A, B)→drawing→washing with water→drying→application of the composite silicate resin→drying.

Weak alkaline degreasing→washing with water→drawing→coating type chromate treatment (C)→forcible drying→application of the composite silicate resin→drying.

It will be seen from the Table below, that the steel sheets No. 1 to No. 37 of the present invention have distinctly superior corrosion resistance to the conventional comparative steel sheets No. 38 to 53. It will also be seen that they are superior to the conventional phosphate treated steel sheet (comparative steel sheet No. 44) in the paintability.

The comparative steel sheet No. 45 is a steel sheet on which the composite silicate resin film was formed without the chromate treatment. The comparative steel sheet No. 46 is a steel sheet on which the composite silicate resin film was formed after phosphate treatment. The comparative steel sheet No. 45 had good paintability comparable to the steel sheets of the present invention, but it is inferior in the corrosion resistance and corrosion resistance after paint coating. The comparative steel sheet No. 46 does not have adequate corrosion resistance and paintability and it is inferior in the corrosion resistance after paint coating.

| No. | H | I | J | K | L | M | N O | N P | N Q | R |
|---|---|---|---|---|---|---|---|---|---|---|
| 1 | S | | A | 20 | a | 1 | 200 | ◎ | ◎ | ◎ | 1 |
| 2 | " | | " | " | " | 4 | 650 | " | " | " | 0.5 |
| 3 | " | | B | " | " | 1 | 200 | " | " | " | 1 |
| 4 | " | | " | " | " | 4 | 650 | " | " | " | 0.5 |
| 5 | " | | " | " | b | 1 | 750 | " | " | " | 1 |
| 6 | " | | " | " | " | 4 | 800 | " | " | " | 0.5 |
| 7 | " | | A | 70 | a | 0.4 | 330 | " | " | " | 1 |
| 8 | " | | " | " | " | 1 | 500 | " | " | " | 0.5 |
| 9 | " | | " | " | c | 1 | 600 | " | " | " | 0.5 |
| 10 | " | | " | " | " | 1.5 | 700 | " | " | " | " |
| 11 | " | | " | " | b | 0.4 | 400 | " | " | " | 0.7 |
| 12 | " | | " | " | " | 1 | 600 | " | " | " | 0.5 |
| 13 | " | | " | " | " | 1.5 | 900 | " | " | " | " |
| 14 | " | | B | " | a | 0.4 | 330 | " | " | " | 1 |
| 15 | " | | " | " | b | " | 400 | " | " | " | 0.7 |
| 16 | S | | C | 70 | b | 0.4 | 400 | ◎ | ◎ | ◎ | 0.6 |
| 17 | " | | A | 150 | a | " | 500 | " | " | " | 1 |
| 18 | T | Ni 12% | A | 70 | a | 0.5 | 800 | " | " | " | 0.8 |
| 19 | " | " | " | " | a | 1 | 1000 | " | " | " | 0.5 |
| 20 | " | " | A | " | b | 0.5 | 900 | " | " | " | 0.5 |
| 21 | " | " | " | " | " | 1 | 1200 | " | " | " | 0.5 |
| 22 | " | " | " | " | c | 0.5 | 1000 | " | " | " | 0.5 |
| 23 | " | " | " | " | " | 1 | 1300 | " | " | " | 0.2 |
| 24 | " | 5 | " | " | " | " | 800 | " | " | " | 1.0 |
| 25 | " | 20 | " | " | " | " | 700 | " | " | " | 1.0 |
| 26 | " | 12 | B | " | " | " | 1300 | " | " | " | 0.2 |
| 27 | " | " | C | " | " | " | 1300 | " | " | " | 0.2 |
| 28 | U | Fe 10% | A | 70 | a | 0.5 | 400 | " | " | " | 0.5 |
| 29 | " | " | " | " | " | 1 | 600 | " | " | " | 0.3 |
| 30 | " | " | " | 70 | b | 1 | 720 | " | " | " | 0.5 |
| 31 | " | " | " | " | c | 0.5 | 500 | " | " | " | 0.5 |
| 32 | " | " | " | " | " | 1 | 800 | " | " | " | 0.2 |
| 33 | U | Fe 10% | B | 70 | c | 1 | 800 | ◎ | ◎ | ◎ | 0.2 |
| 34 | " | " | C | " | " | " | 800 | " | " | " | 0.2 |
| 35 | " | 5 | A | " | " | " | 400 | " | " | " | 1.0 |
| 36 | " | 30 | A | " | " | " | 400 | " | " | " | 1.0 |
| 37 | " | 50 | A | " | " | " | 400 | " | " | " | 1.5 |
| 38 | V | | " | 20 | — | — | <24 | x | x | x | 5 |
| 39 | " | | " | 70 | — | — | 80 | x | x | x | 5 |
| 40 | " | | B | 20 | — | — | <24 | x | x | x | 5 |
| 41 | " | | B | 70 | — | — | 80 | x | x | x | 5 |
| 42 | " | | C | 20 | — | — | <24 | Δ | x | Δ | 4 |
| 43 | " | | " | 70 | — | — | 80 | Δ | x | Δ | 4 |
| 44 | " | | W | — | — | — | <72 | ◎ | ○ | ○ | 3 |
| 45 | " | | — | — | a | 1 | <24 | ◎ | ◎ | ◎ | 5 |
| 46 | " | | X | — | a | 1 | <20 | ◎ | ○ | ○ | 3 |
| 47 | T | Ni: 5% | A | 70 | — | — | 130 | Δ | x | Δ | 2.5 |
| 48 | " | Ni: 12% | " | " | — | — | 150 | Δ | x | Δ | 2.0 |
| 49 | " | Ni: 20% | " | " | — | — | 130 | Δ | x | Δ | 3.0 |
| 50 | Y | Fe: 5% | A | 70 | — | — | 60 | ○ | Δ | Δ | 1.0 |
| 51 | " | Fe: 10% | " | " | — | — | 100 | ◎ | ○ | ○ | 1.0 |
| 52 | " | Fe: 30% | " | " | — | — | 60 | ○ | Δ | Δ | 1.0 |
| 53 | " | Fe: 50% | " | " | — | — | 60 | ○ | Δ | Δ | 1.5 |

No. 1 to No. 37: Inventive steels;
No. 38 to No. 53: Comparative steels
H: Mother sheets
I: Chromate treatment solution
J: Cr plating amount (mg/m$^2$)
K: Compound organic silicate treatment solution
L: Secondary film thickness (μ)
M: Time (hr) till appearance of white rust
N: Coating adhesion Refer to NOTE 1.
O: Lattice cut test Refer to NOTE 2.
P: Lattice cut Erichsen test Refer to NOTE 3.
Q: Dupon shock Refer to NOTE 4.
R: Corrosion resistance after plating Refer to NOTE 5.*○
S: Galvanized steel sheets
T: Zn—Ni alloy steel sheet
U: Zn—Fe alloy steel sheet by galvanization
V: Galvanized steel sheet
W: Phosphate treatment solution
X: Phosphate treatment solution
Y: Zinc—Fe alloy steel sheet by galvanization
*○ Peeled length on one side
NOTE 1: Melamine alkyd paint (paint film thickness: 30)
NOTE 2: Squares of 1 m/m were arranged in the vertical and horizontal direction; 10 squares in each direction
NOTE 3: Pressed by 5 m/m after forming the squares of NOTE 2
NOTE 4: Weight of 1 kg was dropped from height of 50 cm with use of ½φ punch.
NOTE 5: The paint of NOTE 1 was used; the paint film formed was crosscut, subjected to a salt spray test for 360 hours and peeled with a scotch tape. The evaluation standards for paintability:◎ ... No peeling of the applied paint film with scotch tape was observed ○ ... Peeling off of the applied paint with a scotch tape was slight Δ ... About 40% of the applied paint film was peeled off x ... More than 40% of the applied paint film was peeled off.

What is claimed is:

1. A composite coating steel sheet having good corrosion resistance, paintability and corrosion resistance after point coating, which consisting essentially of a plated base steel sheet, a chromate film formed on the surface of the plated base steel sheet and a composite silicate resin film formed on the chromate film and consisting essentially of a colloidal silica, an organic resin and a silane compound.

2. The steel sheet as claimed in claim 1, in which said plated base steel sheet is a galvanized steel sheet.

3. The steel sheet as claimed in claim 1, in which said plated base steel sheet is a zinc-iron alloy plated steel sheet.

4. The steel sheet as claimed in claim 3, in which the zinc-iron alloy layer of said zinc-iron alloy plated steel sheet contains from 5 to 50% by weight of iron.

5. The steel sheet as claimed in claim 3, in which the zinc-iron alloy layer of said zinc-iron alloy plated steel sheet contains from 10 to 30% by weight of iron.

6. The steel sheet as claimed in claim 1, in which said plated base steel sheet is a zinc-nickel alloy plated steel sheet.

7. The steel sheet as claimed in claim 6, in which the zinc-nickel alloy layer of said zinc-nickel alloy plated steel sheet contains from 5 to 20% by weight of nickel.

8. The steel sheet as claimed in claim 6, in which the zinc-nickel alloy layer of said zinc-nickel alloy plated steel sheet contains from 12 to 13% by weight of nickel.

9. The steel sheet as claimed in claim 1, in which said plated base steel sheet is a zinc-manganese alloy plated steel sheet.

10. The steel sheet as claimed in claim 1, in which said plated base steel sheet is an aluminum plated steel sheet.

11. The steel sheet as claimed in claim 1, in which said plated base steel sheet is a multi-layer plated steel sheet having at least two layers selected from a zinc layer, a zinc-iron alloy layer, a zinc-nickel alloy layer, a zinc-manganese alloy layer and an aluminum layer.

12. The steel sheet as claimed in any one of claims 1 to 11, in which the coating amount of the chromate film is from 10 to 150 mg/m$^2$, as calculated as metal chromium.

13. The steel sheet as claimed in any one of claims 1 to 11, in which the coating amount of the chromate film is from 40 to 100 mg/m$^2$, as calculated as metal chromium.

14. The steel sheet as claimed in claim 1, in which said composite silicate resin film has a thickness of from 0.04 to 4 μm.

15. The steel sheet as claimed in claim 1, in which said composite silicate resin film has a thickness of from 0.4 to 4 μm.

16. The steel sheet as claimed in any one of claims 1 to 11, in which the coating amount of said chromate film is from 70 to 100 mg/m$^2$ as calculated as metal chromium and said composite silicate resin film has a thickness of from 0.5 to 0.9 μm.

17. The steel sheet as claimed in claim 1, in which said composite silicate resin film is formed by application of a composite silicate resin treatment solution prepared by adding, to a treatment solution composed of a mixture of a colloidal silica and an organic resin in a solid content weight ratio of from 5:95 to 95:5, from 0.5 to 15% by weight, based on the weight of the total solid content of said colloidal silica and organic resin, of a silane compound.

18. The steel sheet as claimed in claim 17, in which said silane compound is added in an amount of from 1 to 10% by weight, based on the weight of the total solid content of said colloidal silica and organic resins.

19. The steel sheet as claimed in claim 17, in which an alkoxide chelate compound is further added to said composite silicate resin treatment solution, in a solid content weight ratio of the treatment solution to the alkoxide chelate compound being from 97:3 to 80:20.

20. The steel sheet as claimed in claim 17, in which one or more additives selected from the group consisting of oxy acids of molybdenum, tungsten, vanadium, tin, boron and silicon, and salts of such oxy acids, are added to said composite silicate resin treatment solution, in a solid content amount of not more than 10% by weight, based on the solid content of the composite silicate resin.

21. The steel sheet as claimed in claim 20, in which said one or more additives are added to the composite silicate resin solution, in a solid content amount of from 0.3 to 5% by weight, based on the solid content of the composite silicate resin.

22. The steel sheet as claimed in claim 20 or 21, in which said additive is ammonium metavanadate.

23. The steel sheet as claimed in claim 17, in which an alkoxide chelate compound and one or more additives selected from the group consisting of oxy acids of molybdenum, tungsten, vanadium, tin, boron and silicon, and salts of such oxy acids, are added to said composite silicate resin treatment solution in the following solid content weight ratios:

$$\text{Alkoxide chelate compound: said one or more additives} = 95:5 \text{ to } 5:95$$

$$\frac{\text{Composite silicate resin}}{\text{Alkoxide chelate compound + said one or more additives}} > 10$$

24. The steel sheet as claimed in claim 17, in which said organic resin is a polyvinyl alcohol, and one or more additives selected from the group consisting of water soluble salts and coordination compounds of copper, zinc, aluminum, zirconium, chromium, cobalt, and nickel, are added to the composite silicate resin treatment solution, in a solid content amount of from 0.3 to 5% by weight, based on the solid content of the treatment solution, and an alkoxide chelate compound is further added in the following solid content weight ratio:

Composite silicate resin + said one or more additives: alkoxide chelate compound = 97:3 to 80:2.

25. The steel sheet as claimed in claim 17, in which said organic resin is an ultraviolet or electron beam curing type resin, and one or more additives selected from the group consisting of oxy acids of molybdenum, tungsten and vanadium and salts of such oxy acids, are added to said composite silicate resin treatment solution, in a solid content amount of from 0.1 to 6% by weight, based on the solid content of the treatment solution, and a photosensitizer selected from the group consisting of zinc oxide, titanium oxide (anatase type), and titanic acid, is added in a solid content amount of from 30 to 200% by weight, based on said one or more additives.

* * * * *